(12) United States Patent
Chen et al.

(10) Patent No.: US 12,436,130 B2
(45) Date of Patent: Oct. 7, 2025

(54) INTELLIGENT WIDE-AREA FIVE-WIRE OXYGEN SENSOR CHIP AND MANUFACTURING METHOD THEREOF

(71) Applicant: SUZHOU INDUSTRIAL PARK FUTES AUTOMOTIVE ELECTRONICS CO., LTD, Suzhou (CN)

(72) Inventors: Ronglang Chen, Wenzhou (CN); Loufu Luo, Suzhou (CN); Shikang Feng, Wenzhou (CN)

(73) Assignee: SUZHOU INDUSTRIAL PARK FUTES AUTOMOTIVE ELECTRONICS CO., LTD, Suzhou (CN)

( * ) Notice: Subject to any disclaimer, the term of this patent is extended or adjusted under 35 U.S.C. 154(b) by 57 days.

(21) Appl. No.: 18/609,437

(22) Filed: Mar. 19, 2024

(65) Prior Publication Data
US 2025/0155402 A1    May 15, 2025

Related U.S. Application Data

(63) Continuation of application No. PCT/CN2024/071348, filed on Jan. 9, 2024.

(30) Foreign Application Priority Data

Nov. 14, 2023 (CN) .......................... 202311506420.2

(51) Int. Cl.
*G01N 27/41* (2006.01)
*G01N 27/30* (2006.01)
(Continued)

(52) U.S. Cl.
CPC .......... *G01N 27/41* (2013.01); *G01N 27/301* (2013.01); *G01N 27/4072* (2013.01);
(Continued)

(58) Field of Classification Search
CPC .. G01N 27/41; G01N 27/301; G01N 27/4072; G01N 27/4076; G01N 27/409;
(Continued)

(56) References Cited

FOREIGN PATENT DOCUMENTS

| CN | 108539238 A | * | 9/2018 | .......... H01M 8/1253 |
| CN | 108732224 A | * | 11/2018 | ............. G01N 27/41 |

(Continued)

OTHER PUBLICATIONS

Jin et al., "Preparation of spherical cobalt carbonate powder with high tap density," 2006, J. Cent. South Univ. Technol., vol. 13(6), pp. 642-646 (Year: 2006).*

(Continued)

*Primary Examiner* — Luan V Van
*Assistant Examiner* — Kaylee Tseng
(74) *Attorney, Agent, or Firm* — Westbridge IP LLC

(57) ABSTRACT

Disclosed are an intelligent wide-range five-wire oxygen sensor chip and a manufacturing method thereof. The chip includes a substrate layer, an outer electrode, a reference electrode, a pump electrode, a pump electrode diffusion barrier and a heater layer, the pump electrode diffusion barrier is printed in a third substrate layer, diffusion of oxygen in an oxygen pumping cavity is controlled and adjusted, a double-side air inlet mode is adopted to replace top small holes and porous air inlet.

8 Claims, 2 Drawing Sheets

(51) Int. Cl.
　　　*G01N 27/407*　　　(2006.01)
　　　*G01N 27/409*　　　(2006.01)

(52) U.S. Cl.
　　　CPC ....... *G01N 27/4076* (2013.01); *G01N 27/409* (2013.01); *G01N 27/4077* (2013.01)

(58) Field of Classification Search
　　　CPC .. G01N 27/4077; G01N 27/407; B32B 3/266; B32B 7/12; B32B 9/04; B32B 33/00; B32B 37/06; B32B 37/10; B32B 37/12; B32B 38/00; B32B 38/04; B32B 38/16; B41M 3/00; B81C 1/00
　　　See application file for complete search history.

(56) References Cited

FOREIGN PATENT DOCUMENTS

| | | |
|---|---|---|
| CN | 211697635 U | 10/2020 |
| EA | 201892841 A1 | 7/2020 |

OTHER PUBLICATIONS

Kong et al., "Stability and Phase Transition of Cobalt Oxide Phases by Machine Learning Global Potential Energy Surface," 2019, J. Phys. Chem. C, vol. 123, pp. 17539-17547 (Year: 2019).*
First Office Action issued in counterpart Chinese Patent Application No. 202311506420.2, dated Dec. 21, 2023.

* cited by examiner

INTELLIGENT WIDE-AREA FIVE-WIRE OXYGEN SENSOR CHIP AND MANUFACTURING METHOD THEREOF

CROSS-REFERENCE TO RELATED APPLICATIONS

This present application is a continuation of International Application No. PCT/CN2024/071348, filed on Jan. 9, 2024, which claims priority to Chinese Patent Application No. 202311506420.2, filed on Nov. 14, 2023. The disclosures of the above-mentioned applications are incorporated herein by reference in their entireties.

TECHNICAL FIELD

The present disclosure relates to the field of oxygen sensor chips, in particular to an intelligent wide-area five-wire oxygen sensor chip and a manufacturing method thereof.

BACKGROUND

Oxygen sensor is an essential part in an electric injection engine control system, and is a key part for controlling automobile exhaust emission, reducing automobile environmental pollution and improving the combustion quality of an automobile engine.

Lean combustion technology of the oxygen sensor can improve the fuel efficiency and reduce the emission of tail air pollutants, but lean combustion easily causes engine flameout, excessive NOx compounds can be generated due to unreasonable mixing, environmental pollution is caused, the wide-area oxygen sensor can accurately monitor the accurate oxygen content in the full-range automobile tail air to reflect the operation condition of the engine, and then an engine computer can adjust according to the real-time condition, so that the combustion efficiency is improved, the pollution emission amount is reduced, and the three-way catalytic operation condition is detected.

The core part of the wide-area five-wire oxygen sensor is a chip, and the manufacturing method of the chip is composed of a heating electrode, an outer electrode, a reference electrode and pump electrode mixing cavity, a pump electrode diffusion barrier and a pump electrode, and is formed by laminating four layers of compact zirconia substrates of a multilayer printed circuit. At present, the pump electrode diffusion barrier air intake mode of the wide-area five-wire oxygen sensor chip is through small hole air intake, but this air intake mode has various defects.

Firstly, the punching depth and precision are not controlled accurately, and the production process is difficult to ensure the data consistency.

Secondly, in the small hole air intake mode, air enters the pump electrode diffusion barrier through the small hole, and certain resistance can be generated. Since the pressure and flow rate of the air may change, the resistance of the small hole intake manner may change accordingly. This may result in the response speed and stability of the oxygen sensor being affected.

Finally, in the small hole air intake mode, the diameter of the small holes is small, and the small holes are easily blocked by tiny particulate matter in the air. This may cause air to fail to normally enter the pump electrode diffusion barrier, affecting the operating performance of the oxygen sensor. In addition, if harmful substances exist in the air, the small holes are easily polluted, thereby affecting the accuracy of the sensor.

SUMMARY

An intelligent wide-area five-wire oxygen sensor chip is provided, including:
- a base layer, wherein the base layer has a four-layer structure, and includes a first base layer, a second base layer, a third base layer and a fourth base layer in sequence from bottom to top;
- an outer electrode disposed above the fourth base layer and configured to contact with oxygen to measure oxygen concentration;
- a reference electrode disposed below the third base layer and configured to receive electrons in oxygen and interact with an electrolyte between the outer electrode and the reference electrode to form a current;
- a pump electrode, wherein the pump electrode includes an upper pump electrode and a lower pump electrode, a pump electrode mixing cavity is provided between the upper pump electrode and the lower pump electrode, the pump electrode mixing cavity penetrates two sides of the third base layer, and a width of the pump electrode mixing cavity is the same as a width of the third base layer;
- a pump electrode diffusion barrier disposed below the pump electrode mixing cavity;
- a heater layer disposed between the first base layer and the second base layer.

The pump electrode diffusion barrier is printed in the third base layer to control and adjust diffusion of oxygen in the pump oxygen chamber.

The pump electrode diffusion barrier is mostly protruded out of the surface of the base layer, and the pump electrode mixing cavity is conveyed to the pump electrode diffusion barrier from small hole air inlet or porous air inlet at the top; the pump electrode diffusion barrier is arranged in the third base layer, and a structure of four pump electrode diffusion barriers on two sides is adopted, specifically, a pit with a certain width is pressed out in the third base layer, and then the pit is filled with diffusion layer printing slurry to form four pump electrode diffusion barriers. On one hand, the structure of the disclosure realizes air inlet from the side surfaces of two sides, does not need air inlet through the top small hole, does not need to carry out small hole punching operation in machining, avoids the problem that the punching depth and precision control do not affect the sensitivity of the sensor chip, and also avoids the problem of response drift after long-term use caused by a porous air inlet mode to a certain extent; and on the other hand, the structure of the double-side pump electrode diffusion barrier can form effective support, prevents the pump electrode mixing cavity from collapsing and sealing caused by medium-temperature isostatic pressing forming and high-temperature sintering in the machining process, and ensures that the cavity of the mixing cavity is not deformed.

A layer of surface insulation is provided below the first base layer, an end lead is provided below the surface insulation, a heater lower insulation is provided below the heater layer, a heater via hole is provided on the first base layer, and the position of the heater via hole directly faces the end lead and is insulated from the heater lower insulation.

An air channel and a heater upper insulating layer are provided below the second base layer.

A reference electrode upper insulation is arranged below the third base layer for insulation, a reference electrode via hole is arranged on the third base layer, and the reference electrode via hole is located on one side of the third base layer and faces the reference electrode.

A pump electrode upper insulation is provided below the fourth base layer, a pump electrode lower insulation is provided below the upper pump electrode, and an electrode via hole is provided on an upper surface of the fourth base layer. The electrode conducting hole, the reference electrode conducting hole and the heater conducting hole are all filled with hole filling materials to respectively form an electrode conducting hole filling, a reference electrode conducting hole filling and a heater conducting hole filling.

An outer electrode lower insulation is arranged below the outer electrode, an end lead is arranged above the outer electrode, and a protective layer is arranged above the end lead.

The surface of the base layer is provided with a layer of tetracobalt trioxide ultra-thin nanostructure.

According to the disclosure, a layer of tetracobalt trioxide ultra-thin nanostructure is deposited on the surface of a substrate layer by utilizing a hydrothermal chemical deposition method, and the generation of the tetracobalt trioxide nano film is promoted by utilizing an anionic surfactant sodium dodecyl benzene sulfonate; compared with a zirconia base layer plate, the addition of the ultrathin tetracobalt trioxide nano film can enable a zirconia film to obtain better electrocatalytic activity and realize faster electron transfer power, and also has a high specific surface area and an excellent response detection effect; and the tetracobalt trioxide is a p-type magnetic semiconductor material and has a spinel structure, and meanwhile, the tetracobalt trioxide is also an ionic semiconductor and has diverse polar sites, so that the oxygen sensor chip can detect charges more sensitive.

Since the present disclosure adopts a novel air inlet manner, that is, the aforementioned air inlet on both sides, changes the porous and small hole manners, and needs to consider the change of resistance and detection sensitivity caused by the change of the air inlet manner, the overall performance needs to be improved from the improvement of the base layer, so as to cooperate to obtain a better sensor detection effect.

The present disclosure further provides a manufacturing method of an intelligent wide-area five-wire oxygen sensor chip, comprising the following steps:

S1, a zirconia casting slurry and a printing slurry is provided, wherein the printing slurry includes a protective layer printing slurry, an insulating layer printing slurry, an electrode layer printing slurry, a diffusion layer printing slurry and an air channel printing slurry;

S2, the zirconia casting slurry is pressed into a zirconia membrane by using an automatic casting machine, ultrasonically cleaning and drying the zirconia membrane, evaporating and adsorbing a 10-15 nm titanium adhesive layer on the dried zirconia membrane in a vacuum evaporation chamber, soaking the zirconia membrane in urea, cobalt chloride and an anionic surfactant for 2 hours, cleaning with deionized water and drying to obtain the zirconia membrane with a cobalt hydroxide nanostructure on the surface;

S3, the zirconia membrane is laminated into a membrane with a desired thickness by a laminating machine, and then performing hot pressing and drying;

S4, the dried zirconia membrane is punched, and the electrode via hole, the reference electrode via hole and the heater via hole are punched out;

S5, the punched membrane with printing slurry is printed, printing on the first base layer, the second base layer, the third base layer and the fourth base layer, printing a protective layer with printing slurry, printing the outer electrode lower insulation, the pump electrode lower insulation, the pump electrode upper insulation, the reference electrode upper insulation, the reference electrode lower insulation, the heater upper insulation, the heater lower insulation and a surface insulation with printing slurry, printing the outer electrode, the end lead, the upper pump electrode, the lower pump electrode, the reference electrode and the heater layer with printing slurry, printing a pump electrode mixing cavity and a pump electrode diffusion barrier with a diffusion layer, and printing the air channel with printing slurry;

S6, the dried zirconia membrane sheets is laminated according to a sequence of the first base layer, the second base layer, the third base layer and the fourth base layer from bottom to top, performing vacuum packaging after laminating, performing warm isostatic pressing molding after packaging, wherein a temperature is set to 50° C., and a time is set to 20 mins;

S7, the formed diaphragm is chamfered and cut, so that a preliminary model of the oxygen sensor chip is manufactured;

S8, the preliminarily formed chip is fed into a sintering furnace for sintering forming, wherein the temperature is set to 1450° C., and the cobalt hydroxide nanostructure on the surface of the zirconia membrane is converted into a tetracobalt trioxide nanostructure, so that the chip is completely formed;

S9, the fully formed chip is detected, wherein the detection includes chip bending detection, sensor leakage test, strength test and electrical performance test, and the electrical performance test further includes heater resistance test, insulation resistance test and current test.

In addition, a polymer film containing polyvinyl chloride, β-cyclodextrin and potassium tetrachlorophenylborate can be adsorbed on the nano film, the influence of water drops in air on the sensitivity of an oxygen sensor chip can be reduced when the oxygen content in tail air is monitored, and the process of annealing at 450° C. needs to be added in the step S2 of the disclosure, a tetracobalt trioxide film is generated in the step, and then the tetracobalt trioxide film is soaked in a film solution of polyvinyl chloride, β-cyclodextrin and potassium tetrachlorophenylborate for multiple times to form a layer of polymer film, so that the detection sensitivity of the chip in a humid environment is ensured.

The zirconia casting slurry includes 50-60% 5 mol % yttria-stabilized zirconia casting power, 2-5% dispersant, 10-15% organic solvent, 20-25% binder and 15-20% binder;

The protective layer printing slurry includes 25-30% alumina powder, 25-30% activated carbon powder, 2-5% binder, 30-35% organic solvent, 2-5% plasticizer and 1-3% dispersant;

The insulating layer printing slurry includes 45-55% nano-alumina powder, 2-5% binder, 30-40% organic solvent, 2-5% plasticizer and 2-5% dispersant;

The electrode layer printing slurry includes 65-75% platinum powder, 3-8% oxide, 2-5% binder and 10-20% organic solvent;

The diffusion layer printing slurry includes 40-50% zirconia powder, 10-20% activated carbon powder, 2-5% binder, 25-35% organic solvent, 2-5% plasticizer and 1-3% dispersant;

The air channel printing slurry includes 20-30% activated carbon powder, 20-30% zirconia powder, 2-5% binder, 40-50% organic solvent, and 1-3% dispersant.

The top small hole and porous air inlet are replaced by the double-side air inlet method, which effectively overcomes the problem that it is difficult to accurately position the small hole.

The zirconium oxide film coated with the tetracobalt trioxide nano-film is used as the base layer, which has better response effect and detection sensitivity.

DETAILED DESCRIPTION OF THE EMBODIMENTS

Unless otherwise defined or stated, all professional and scientific terms used herein have the same meaning as familiar to those skilled in the art. In addition, any methods and materials similar or equivalent to those described may be used in the present disclosure.

Figure 1:
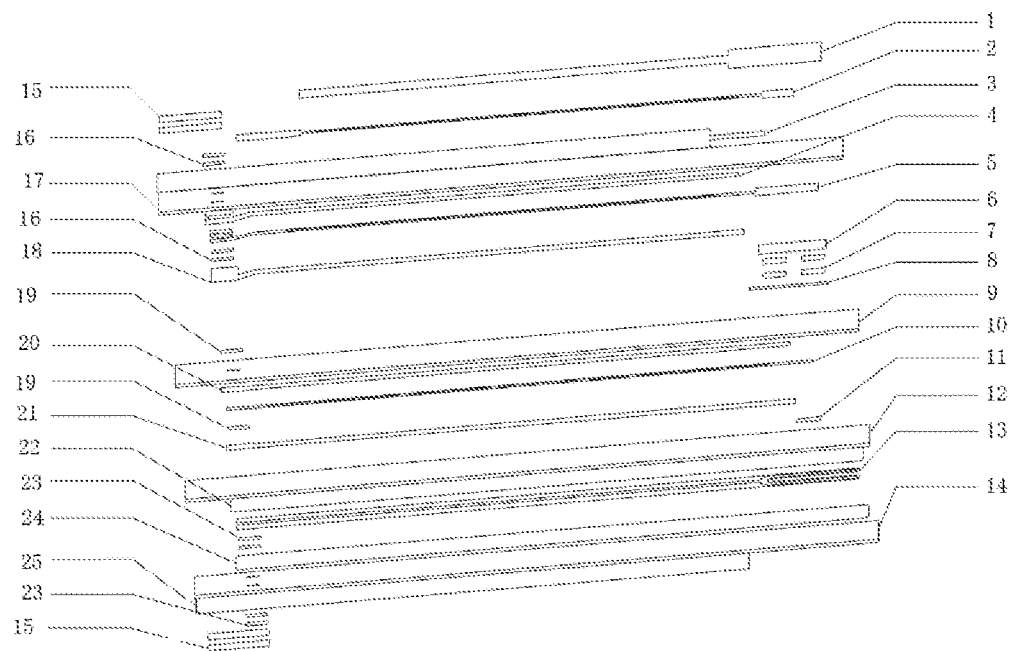
FIG. 1 is a schematic structural diagram of embodiment 1 according to this application.

As shown in FIG. 1, an intelligent wide-area five-wire oxygen sensor chip is provided as embodiment 1, in which comprising:

a base layer, wherein the base layer has a four-layer structure, and includes a first base layer 14, a second base layer 12, a third base layer 9 and a fourth base layer 17 in sequence from bottom to top;

an outer electrode 2 disposed above the fourth base layer 17 and configured to contact with oxygen to measure oxygen concentration;

a reference electrode 10 disposed below the third base layer 9 and configured to receive electrons in oxygen and interact with an electrolyte between the outer electrode 2 to form a current;

a pump electrode, wherein the pump electrode includes an upper pump electrode 5 and a lower pump electrode 8, a pump electrode mixing cavity 6 is provided between the upper pump electrode 5 and the lower pump electrode 8, the pump electrode mixing cavity 6 penetrates two sides of the third base layer 9, and a width of the pump electrode mixing cavity 6 is the same as a width of the third base layer 9;

a pump electrode diffusion barrier 7 disposed below the pump electrode mixing cavity 6; and a heater layer 13 disposed between the first base layer 14 and the second base layer 12.

The pump electrode diffusion barrier 7 is printed in the third base layer 9 to control and adjust diffusion of oxygen in the pump oxygen chamber 28.

The pump electrode diffusion barrier 7 is mostly protruded out of the surface of the base layer, and the pump electrode mixing cavity 6 is conveyed to the pump electrode diffusion barrier 7 from small hole air inlet or porous air inlet at the top; the pump electrode diffusion barrier 7 is arranged in the third base layer 9, and a structure of four pump electrode diffusion barriers 7 on two sides is adopted, specifically, a pit with a certain width is pressed out in the third base layer 9, and then the pit is filled with diffusion layer printing slurry to form four pump electrode diffusion barriers 7. On one hand, the structure realizes air inlet from the side surfaces of two sides, does not need air inlet through the top small hole, does not need to carry out small hole punching operation in machining, avoids the problem that the punching depth and precision control do not affect the sensitivity of the sensor chip, and also avoids the problem of response drift after long-term use caused by a porous air inlet mode to a certain extent; and on the other hand, the structure of the double-side pump electrode diffusion barrier 7 can form effective support, prevents the pump electrode mixing cavity 6 from collapsing and sealing caused by medium-temperature isostatic pressing forming and high-temperature sintering in the machining process, and ensures that the cavity of the mixing cavity is not deformed.

A layer of surface insulation 25 is provided below the first base layer 14, an end lead 15 is provided below the surface insulation, a heater lower insulation 24 is provided below the heater layer 13, a heater via hole is provided on the first base layer 14, and the position of the heater via hole directly faces the end lead 15 and the heater lower insulation 24.

An air channel 11 and a heater upper insulating layer are provided below the second base layer 12.

A reference electrode upper insulation 20 is arranged below the third base layer 9 for insulation, a reference electrode via hole is arranged on the third base layer 9, and the reference electrode via hole is located on one side of the third base layer 9 and faces the reference electrode 10.

A pump electrode upper insulation 4 is disposed below the fourth base layer 17, a pump electrode lower insulation 18 is disposed below the upper pump electrode 5, and an electrode via hole is disposed on an upper surface of the fourth base layer 17. The electrode via hole, the reference electrode via hole and the heater via hole are filled with hole material to form an electrode via hole 16, a reference electrode via hole 19 and a heater via hole 23 respectively.

An outer electrode lower insulation 3 is arranged below the outer electrode 2, the end lead 15 is arranged above the outer electrode 2, and a protective layer 1 is arranged above the end lead 15.

The surface of the base layer is provided with a layer of tetracobalt trioxide ultra-thin nanostructure.

A layer of tetracobalt trioxide ultra-thin nanostructure is deposited on the surface of a substrate layer by utilizing a hydrothermal chemical deposition method, and the generation of the tetracobalt trioxide nano film is promoted by utilizing an anionic surfactant sodium dodecyl benzene sulfonate; compared with a zirconia base layer plate, the addition of the ultrathin tetracobalt trioxide nano film can enable a zirconia film to obtain better electrocatalytic activity and realize faster electron transfer power, and also has a high specific surface area and an excellent response detection effect; and the tetracobalt trioxide is a p-type magnetic semiconductor material and has a spinel structure, and meanwhile, the tetracobalt trioxide is also an ionic semiconductor and has diverse polar sites, so that the oxygen sensor chip can detect charges more sensitive.

Since the present disclosure adopts a novel air inlet manner, that is, the aforementioned air inlet on both sides, changes the porous and small hole manners, and needs to consider the change of resistance and detection sensitivity caused by the change of the air inlet manner, the overall performance needs to be improved from the improvement of the base layer, so as to cooperate to obtain a better sensor detection effect.

Figure 3:
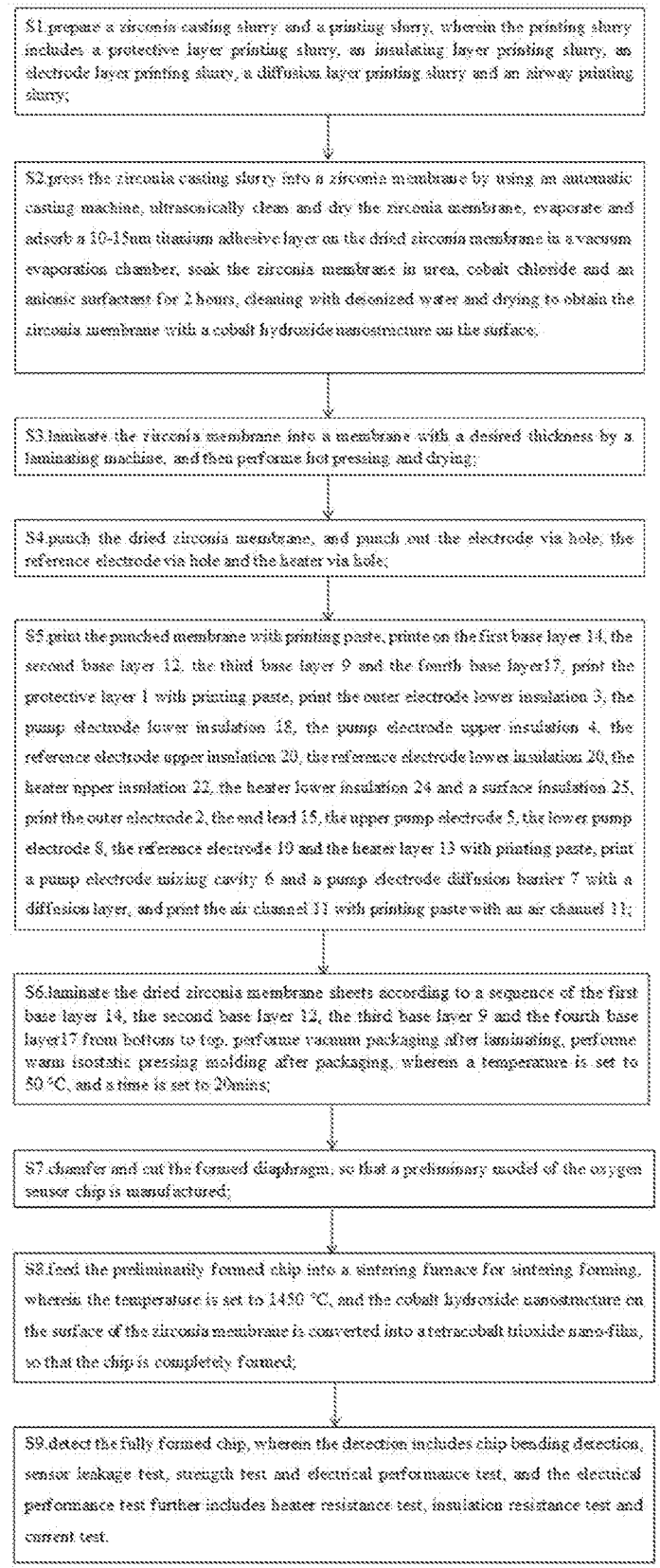
FIG. 3 is a flowchart of this application.

As shown in FIG. 3, the present disclosure further provides a manufacturing method of an intelligent wide-area five-wire oxygen sensor chip, comprising the following steps:

S1, preparing a zirconia casting slurry and a printing slurry, wherein the printing slurry includes a protective layer printing slurry, an insulating layer printing slurry, an electrode layer printing slurry, a diffusion layer printing slurry and an air channel printing slurry;

S2, pressing the zirconia casting slurry into a zirconia membrane by using an automatic casting machine, ultrasonically cleaning and drying the zirconia membrane, evaporating and adsorbing a 10-15 nm titanium adhesive layer on the dried zirconia membrane in a vacuum evaporation chamber, soaking the zirconia membrane in urea, cobalt chloride and an anionic surfactant for 2 hours, cleaning with deionized water and drying to obtain the zirconia membrane with a cobalt hydroxide nanostructure on the surface;

S3, laminating the zirconia membrane into a membrane with a desired thickness by a laminating machine, and then performing hot pressing and drying;

S4, punching the dried zirconia membrane, and punching out the electrode via hole, the reference electrode via hole and the heater via hole;

S5, printing the punched membrane with printing slurry, printing on the first base layer 14, the second base layer 12, the third base layer 9 and the fourth base layer 17, printing the protective layer 1 with printing slurry, printing the outer electrode lower insulation 3, the pump electrode lower insulation 18, the pump electrode upper insulation 4, the reference electrode upper insulation 20, the reference electrode lower insulation 20, the heater upper insulation 22, the heater lower insulation 24 and a surface insulation 25, printing the outer electrode 2, the end lead 15, the upper pump electrode 5, the lower pump electrode 8, the reference electrode 10 and the heater layer 13 with printing slurry, printing a pump electrode mixing cavity 6 and a pump electrode diffusion barrier 7 with a diffusion layer, and printing the air channel 11 with printing slurry;

S6, laminating the dried zirconia membrane sheets according to a sequence of the first base layer 14, the second base layer 12, the third base layer 9 and the fourth base layer 17 from bottom to top, performing vacuum packaging after laminating, performing warm isostatic pressing molding after packaging, wherein a temperature is set to 50° C., and a time is set to 20 mins;

S7, chamfering and cutting the formed diaphragm, so that a preliminary model of the oxygen sensor chip is manufactured;

S8, feeding the preliminarily formed chip into a sintering furnace for sintering forming, wherein the temperature is set to 1450° C., and the cobalt hydroxide nanostructure on the surface of the zirconia membrane is converted into a tetracobalt trioxide nanostructure, so that the chip is completely formed;

S9, detecting the fully formed chip, wherein the detection includes chip bending detection, sensor leakage test, strength test and electrical performance test, and the electrical performance test further includes heater resistance test, insulation resistance test and current test.

In addition, a polymer film containing polyvinyl chloride, β-cyclodextrin and potassium tetrachlorophenylborate can be adsorbed on the nano film, the influence of water drops in air on the sensitivity of an oxygen sensor chip can be reduced when the oxygen content in tail air is monitored, and the process of annealing at 450° C. needs to be added in the step S2 of the disclosure, a tetracobalt trioxide film is generated in the step, and then the tetracobalt trioxide film is soaked in a film solution of polyvinyl chloride, β-cyclodextrin and potassium tetrachlorophenylborate for multiple times to form a layer of polymer film, so that the detection sensitivity of the chip in a humid environment is ensured. In order to verify the technical effect of the cobalt trioxide ultrathin nanostructure on the surface of the substrate layer compared with the substrate layer, the LOD (detection limit) value of the processed oxygen sensor chip is tested, and the result shows that the oxygen sensor chip has a lower LOD value, linear deviation cannot occur even if the oxygen concentration in the detected air is lower, and compared with an existing wide-range five-line oxygen sensor chip, the wide-range five-line oxygen sensor chip has a lower LOD value, a wider detection range and better detection sensitivity.

The zirconia casting slurry includes 50-60% 5 mol % yttria-stabilized zirconia casting power, 2-5% dispersant, 10-15% organic solvent, 20-25% binder and 15-20% binder;

A protective layer printing slurry includes 25-30% alumina powder, 25-30% activated carbon powder, 2-5% binder, 30-35% organic solvent, 2-5% plasticizer and 1-3% dispersant;

An insulating layer printing slurry includes 45-55% nano-alumina powder, 2-5% binder, 30-40% organic solvent, 2-5% plasticizer and 2-5% dispersant;

An electrode layer printing slurry includes 65-75% platinum powder, 3-8% oxide, 2-5% binder and 10-20% organic solvent;

A diffusion layer printing slurry includes 40-50% zirconia powder, 10-20% activated carbon powder, 2-5% binder, 25-35% organic solvent, 2-5% plasticizer and 1-3% dispersant;

An airway printing slurry includes 20-30% activated carbon powder, 20-30% zirconia powder, 2-5% binder, 40-50% organic solvent, and 1-3% dispersant.

Figure 2:
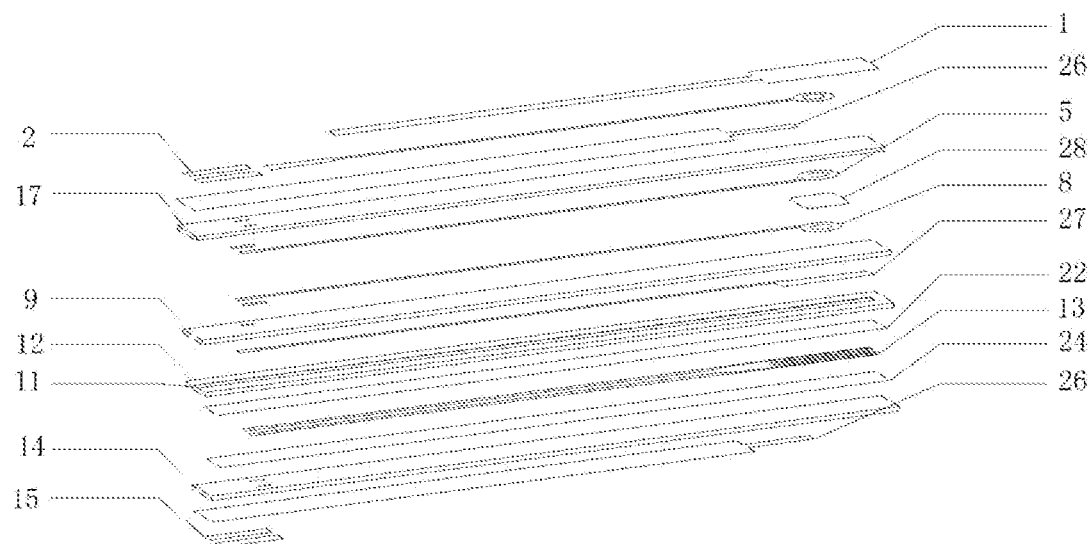
FIG. 2 is a schematic structural diagram of embodiment 2 according to this application.

In addition to the dual-cell wide-range oxygen sensor chip with the reference electrode 10, the present disclosure also has another single-cell wide-range oxygen sensor chip as shown in FIG. 2, which, as a second embodiment of the present disclosure, sequentially includes from bottom to top: the end lead 15, the end insulator 26, the first base layer 14, the heater lower insulator 24, the heater layer 13, a heater upper insulator 22, the second base layer 12, the air channel 11 provided on the second base layer 12, an inner electrode 27, the third base layer 9, the lower pump electrode 8, the oxygen pumping chamber 28, the upper pump electrode 5, the fourth base layer 17, an end insulator 26, the outer electrode 2 and the protective layer 1.

The manufacturing method of the single cell oxygen sensor chip is the same as the manufacturing method of the previous embodiment, and the single cell oxygen sensor chip also has four base layers; during manufacturing, a steel strip casting method is adopted to cast a membrane with a thickness of 60-80 microns, and then the membrane is laminated into a certain thickness, and then the base membrane with a thickness of 0.4 mm is hot-pressed at 65° C. in an isostatic pressing manner, and then each functional layer is sequentially laminated after being printed by using a slurry with the same formula, specifically: printing a platinum outer electrode 2 on the fourth base layer 17, printing a protective layer 1 on the outer electrode 2, printing the end insulation 26 under the outer electrode 2, printing an upper pump electrode 5 under the fourth base layer 17, printing the lower pump electrode 8 and the oxygen pumping cavity 28 on the upper surface of the third base layer 9, printing the inner electrode 27 under the third base layer 9, printing the air channel 11 on the upper surface of the second base layer 12, printing the upper insulation 22 under the second base layer 12, printing the heater layer 13 and the lower insulation 24 under the heater on the upper surface of the first base layer 14 respectively, and printing the end insulation 26 and the end lead 15 under the first base layer 14. The method includes the following steps: sequentially stacking the printed four films into a single five-wire chip, carrying out a cutting process, and then sintering the chip according to a sintering curve at the high temperature of 1450° C. for 2 hours through glue discharging and sintering.

After the two embodiments of the present disclosure are processed, they need to be detected, the detection items include: chip bending detection, sensor leakage test, strength test and electrical performance test, wherein the electrical performance test further includes heater resistance test, insulation resistance test and current test.

Chip bending detection: randomly taking 100 chips, placing the chips on a high-flatness workbench, and respectively taking three points at the head, the middle and the tail of the sensor by using a plug ruler for testing, wherein the test thicknesses are all less than 0.1 mm.

Sensor leakage test: The leakage rate is tested by a leakage tester after randomly taking 100 chips and assembling, and a pressure of 3.6±0.1 bar is applied to the air reference channel of the sensor, and the leakage amount is less than 0.43 ml/min.

Strength test: 10 chips were extracted for three-point bending strength test, and the bending strength of the oxygen sensor was greater than 50 Mpa.

Electrical Performance Test

The resistance test of the heater: randomly taking 100 chips, and testing the normal temperature resistance value of the heating electrode through the heating pin by using a multimeter, wherein the resistances are within 3±1 ohm.

Insulation resistance test: randomly taking 100 chips, and testing the insulation resistance of the heater to the signal outer electrode 2, the insulation resistance of the heater to the reference electrode 10, and the insulation resistance of the signal outer electrode 2 to the reference electrode 10 through an insulation instrument respectively is greater than 10 MΩ.

Current test: randomly taking 100 chips to assemble into a finished product, and measuring the current in the air by a wide-range detection device, wherein the input voltage is 8-10V, and the pump current is 1.3-6 mA.

In the present disclosure, the five-linewidth domain oxygen sensor chip adopts a structure of air inlet on both sides, and its special pump electrode air inlet mode and manufacturing method can be used for production and manufacturing of five-linewidth domain oxygen sensor chips of different product types, and the internal resistance and the size of the pump electrode can be adjusted according to the product type, for example, the gap ratio of the pump electrode diffusion barrier 7 is finely adjusted to change the size of the pump electrode, etc., and such adjustment falls within the protection scope of the present disclosure.

The above description is specific embodiments of the present disclosure, but the protection scope of the present disclosure is not limited thereto, and any person skilled in the art may easily conceive changes or substitutions within the technical scope disclosed by the present disclosure, which shall be covered within the protection scope of the present disclosure. Therefore, the protection scope of the present disclosure shall be defined by the protection scope of the claims.

What is claimed is:

1. An intelligent wide-area five-wire oxygen sensor chip, comprising:
   a base layer, wherein the base layer has a four-layer structure, and comprises a first base layer, a second base layer, a third base layer and a fourth base layer in sequence from bottom to top;
   an outer electrode disposed above the fourth base layer and configured to contact with oxygen to measure oxygen concentration;
   a reference electrode disposed below the third base layer and configured to receive electrons in oxygen and interact with an electrolyte between the outer electrodes and the reference electrode to form a current;
   a pump electrode, wherein the pump electrode comprises an upper pump electrode and a lower pump electrode, a pump electrode mixing cavity is provided between the upper pump electrode and the lower pump electrode, the pump electrode mixing cavity penetrates two sides of the third base layer, and a width of the pump electrode mixing cavity is the same as a width of the third base layer;
   a pump electrode diffusion barrier disposed below the pump electrode mixing cavity;
   a heater layer disposed between the first base layer and the second base layer; and
   wherein the pump electrode diffusion barrier is printed in the third base layer to control and adjust diffusion of oxygen in the pump oxygen cavity, the surface of the base layer is provided with a layer of tetracobalt trioxide ultrathin nanostructure formed by converting cobalt hydroxide nanostructures.

2. The chip according to claim 1, wherein a layer of surface insulation is provided below the first base layer, an end lead is provided below the surface insulation, a heater lower insulation is provided below the heater layer, a heater via hole is provided on the first base layer, and the position of the heater via hole directly faces the end lead and is insulated from the heater lower insulation.

3. The chip according to claim 2, wherein an air channel and a heater upper insulating layer are provided below the second base layer.

4. The chip according to claim 3, wherein a reference electrode upper insulation is arranged below the third base layer for insulation, a reference electrode via hole is arranged on the third base layer, and the reference electrode via hole is located on one side of the third base layer and faces the reference electrode.

5. The chip according to claim 4, wherein a pump electrode upper insulation is provided below the fourth base layer, a pump electrode lower insulation is provided below the upper pump electrode, and an electrode via hole is provided on an upper surface of the fourth base layer, the electrode conducting hole, the reference electrode conducting hole and the heater conducting hole are all filled with hole filling materials to respectively form an electrode conducting hole filling, a reference electrode conducting hole filling and a heater conducting hole filling.

6. The chip according to claim 5, wherein an outer electrode lower insulation is arranged below the outer electrode, an end lead is arranged above the outer electrode, and a protective layer is arranged above the end lead.

7. A method for manufacturing the intelligent wide-range five-wire oxygen sensor chip according to claim 6, comprising:

S1, preparing a zirconia casting slurry and a printing slurry, wherein the printing slurry comprises a protective layer printing slurry, an insulating layer printing slurry, an electrode layer printing slurry, a diffusion layer printing slurry and an air channel printing slurry;

S2, pressing the zirconia casting slurry into a zirconia membrane by using an automatic casting machine, ultrasonically cleaning and drying the zirconia membrane, evaporating and adsorbing a 10-15 nm titanium adhesive layer on the dried zirconia membrane in a vacuum evaporation chamber, soaking the zirconia membrane in urea, cobalt chloride and an anionic surfactant for 2 hours, cleaning with deionized water and drying to obtain the zirconia membrane with a cobalt hydroxide nanostructure on the surface;

S3, laminating the zirconia membrane into a membrane with a desired thickness by a laminating machine, and then performing hot pressing and drying;

S4, punching the dried zirconia membrane, and punching out the electrode via hole, the reference electrode via hole and the heater via hole;

S5, printing the punched membrane with the printing slurry, printing on the first base layer, the second base layer, the third base layer and the fourth base layer, printing a protective layer with the printing slurry, printing the outer electrode lower insulation, the pump electrode lower insulation, the pump electrode upper insulation, the reference electrode upper insulation, the reference electrode lower insulation, the heater upper insulation, the heater lower insulation and the surface insulation with the printing slurry, printing the outer electrode, the end lead, the upper pump electrode, the lower pump electrode, the reference electrode and the heater layer with the printing slurry, printing the pump electrode mixing cavity and the pump electrode diffusion barrier, and printing the air channel with the printing slurry;

S6, laminating the dried zirconia membrane sheets according to a sequence of the first base layer, the second base layer, the third base layer and the fourth base layer from bottom to top, performing vacuum packaging after laminating, performing warm isostatic pressing molding after packaging, wherein a temperature is set to 50° C., and a time is set to 20 mins;

S7, chamfering and cutting the formed diaphragm, so that a preliminary model of the oxygen sensor chip is manufactured;

S8, feeding the preliminarily formed chip into a sintering furnace for sintering forming, wherein the temperature is set to 1450° C., and the cobalt hydroxide nanostructure on the surface of the zirconia membrane is converted into the tetracobalt trioxide nanostructure, so that the chip is completely formed; and S9, detecting the fully formed chip, wherein the detection comprises chip bending detection, sensor leakage test, strength test and electrical performance test, and the electrical performance test further comprises heater resistance test, insulation resistance test and current test.

8. The method according to claim 7, wherein the zirconia casting slurry comprises 50-60% 5 mol % yttria-stabilized zirconia casting powder, 2-5% dispersant, 10-15% organic solvent, 20-25% binder and 15-20% binder;

the protective layer printing slurry comprises 25-30% alumina powder, 25-30% activated carbon powder, 2-5% binder, 30-35% organic solvent, 2-5% plasticizer and 1-3% dispersant;

the insulating layer printing slurry comprises 45-55% nano-alumina powder, 2-5% binder, 30-40% organic solvent, 2-5% plasticizer and 2-5% dispersant;

the electrode layer printing slurry comprises 65-75% platinum powder, 3-8% oxide, 2-5% binder and 10-20% organic solvent;

the diffusion layer printing slurry comprises 40-50% zirconia powder, 10-20% activated carbon powder, 2-5% binder, 25-35% organic solvent, 2-5% plasticizer and 1-3% dispersant;

the air channel printing slurry comprises 20-30% activated carbon powder, 20-30% zirconia powder, 2-5% binder, 40-50% organic solvent, and 1-3% dispersant.

\* \* \* \* \*